Patented May 2, 1944

2,347,783

UNITED STATES PATENT OFFICE 2,347,783

METHOD OF PROCESSING WOOD FOR THE RAPID MATURATION OF WHISKY AND OTHER ALCOHOLIC LIQUORS AND WINES

Ernst T. Krebs, San Francisco, Calif.

No Drawing. Application October 1, 1941, Serial No. 413,180

10 Claims. (Cl. 99—48)

This invention relates to a method of processing wood for the rapid maturation of whisky and other alcoholic liquors and wines, and especially to improvements over my Patent No. 2,224,352, issued December 10, 1940, entitled "Method of processing wood for the rapid maturation of whisky and other alcoholic liquors and wines."

It has been discovered that oak wood contains spores of cryptogams and fungi which, when activated into profuse growth, have an action of aging or maturing liquors and wines; that is, the product of the growth resulting from the activation of the spores and fungi brings about rapid maturation and aging of the liquors or wines and causes development of bouquet and flavor.

The cryptogamic spores, when properly activated, bring about a profuse cryptogamic growth. The cryptogamic growth in turn secretes an enzyme complex which is rich in tannase and the growth itself is rich in aminosuccinamides. The tannase hydrolizes the tannins in the oak wood, thereby forming other acids which have a structure different from the tannins, which acids form their corresponding esters with the alcohols in the liquor or wines. Upon the addition of liquor or wine the amino-succinamides are dissolved and finally dissociated into succinic and succinamic acids and amino groups, and at the same time cause oxidation. The succinic and succinamic acids, as well as the amino groups, form their corresponding esters.

After the cryptogamic growth has been developed from its spores, and an adequate amount of tannase has been formed chemically to alter the structure of the tannins, the fungi begin to develop; and it has been found that some of these are detrimental, as they produce an off-taste in the liquor or wines. However, one group of fungus (Penicillium) has been found which is beneficial both to the production of bouquet and improvement of flavor. The development of this fungus (Penicillium) and the repression of undesirable fungi form the subject matter of the present application.

Briefly stated, the method of processing the wood to promote the growth of cryptogamic spores and the one group of fungus known as Penicillium, of the yellow and green variety, is as follows:

White oak, preferably bourbon oak, comminuted, and an equal amount of the same comminuted wood which has been lightly toasted, is mixed with acorn kernels ground to an impalpable powder. The untoasted and toasted comminuted oak, together with the acorn kernels ground to an impalpable powder, are thoroughly mixed; then to this is added a solution of 1 to 150 of magnesium chloride. This is thoroughly mixed and will give the proper moisture to the entire mixture, which should be placed in a suitable covered container, preferably non-metallic. The mixture in the moistened state is allowed to germinate at a room temperature of from 75° to 85° C. for a period of from five to ten days. By this time the crytogamic growth should be fully developed, and the enzymes liberated thereby should have completely dissociated the tannins.

When this has occurred, additional comminuted oak, toasted to light golden brown color, is added, and a sufficient additional amount of a solution of 1 to 150 of magnesium chloride, to provide the proper moisture, is also added. During the toasting process the spores of most of the fungi in this oak wood have been destroyed. The enzyme tannase liberated during the first incubation period again functions, and when the tannins in the newly added wood are thoroughly dissociated, the Penicillia alone will begin to develop, as the aminosuccinamide seems to be a favorable media for their rapid development and growth. The Penicillia are of the yellow and green-blue variety. They seem to be aerobic but are strongly facultative.

In ten to twenty days after the last amount of toasted wood has been added, depending upon the temperature, the Penicillia should be fully developed, and the processed wood is now ready for the addition of white whisky, brandy, or fortified wines to be aged.

During the whole processing of the wood, both during the first and the second period, it should be mixed each day or two, so that all of the wood is kept evenly moist. The water used to dissolve the magnesium chloride is preferably tap water that has been boiled. The acorn kernels employed may be fresh or they may have been preserved in alcohol until ready for use. If they have been preserved in alcohol, they should be soaked in sterile water for several hours before being ground to an impalpable powder. It has been found that acorn kernels preserved in 95% ethyl alcohol or in 99% isopropyl alcohol for one year retain their growth stimulating properties.

Other woods may be used for the same purpose. An example is the glycyrrhizae, which is rich in crytogamic spores, the proper tannins, and the Penicillia.

The proper proportions of comminuted oak wood, that is, in the form of shavings or finely cut chips, the amount of magnesium chloride solution employed, and also the amount of ground acorn, will be as follows:

One pound of comminuted white oak, untoasted, is mixed with one pound of the wood lightly toasted, or two pounds of lightly toasted wood may be employed. To this is added 10% to 20% by weight of acorn kernels ground to an impalpable powder; the kernels employed may be fresh or they may be kernels that have been preserved in alcohol. The toasted and untoasted wood, together with the acorn powder, is thoroughly mixed, and to this is added about four pounds of magnesium chloride solution 1 to 150. The entire batch is again mixed and placed in a suitable covered container (such as charred oak wood, glass, enamelled metal or the like), which is only partially filled. It is best placed in a room maintained at a temperature from 75° to 85° C. for a period of from five to ten days, and it should be mixed each day or so to maintain the wood at a uniform moisture.

If there is any tendency to dry out, additional magnesium chloride in solution specified should be added.

In from five to ten days, depending on the temperature, the growth will be fully developed, and the enzyme liberated by the growth should have completely dissociated the tannins contained in the oak wood. A suitable test to determine whether this stage of the incubation period has been completed is as follows:

Each day, beginning with the fourth day, a small sample of the processed wood is macerated for twelve hours with about three or four times its bulk volume of 100 proof white whisky and tested for complete tannin conversion. When three drops of a 1% aqueous solution of ferric chloride are added to 3 cc. of this extract, no blue color or precipitate should be produced, but a clear olive green or amber color should result, showing that the extract is free of gallic acid.

If the test proves that the tannic and gallic acids of the wood have been fully converted, then it is ready for further treatment.

At this time one pound of comminuted white oak, toasted to a light golden brown color, is added, and an additional two pounds of a solution 1 to 150 of magnesium chloride. The whole batch is again mixed and placed in the container and allowed to remain therein for a period of from ten to twenty days, depending upon the temperature of the room. During this period Penicillia alone should be developed, as the toasting operation has destroyed most of the remaining fungi. When the Penicillia have reached a prolific growth, a fruit mustard-like odor is developed. The tannins of the added wood will become fully dissociated, and the batch as a whole is ready to be mixed with the white whisky, wine, or liquor to be aged.

Each ounce of the processed wood will treat sixteen times this amount of white whisky. In other words, one pound of the moist processed wood will treat approximately two gallons. For fortified wines, only about half the amount of processed wood is required.

In actual practice, a non-metal container with an outlet below, is employed. In this container is placed, for instance, one pound of processed wood, and to this is added two gallons of white whisky. After the addition of the whisky, the contents are thoroughly mixed or stirred and allowed to macerate for twenty to thirty days. The contents are drained off each second or third day and immediately returned. After the final draining, the whisky is filtered and bottled. After bottling, the whisky continues to mellow and becomes more ethereal. In a month it is ready for the market.

Three important steps are involved in the treatment as a whole:

(1) It has been found that the comminuted toasted oak wood must be added as soon as the tannins of the mixed toasted and untoasted wood have become dissociated by the tannase of the cryptogamic growth.

(2) The solution of magnesium chloride employed should not be less than 1 to 200, preferably 1 to 150.

(3) Less adventitious fungi develop when the acorn kernels have been preserved for several weeks or months in 95% ethyl alcohol.

The phenomena which occur in the processing of the oak wood, so far as my knowledge extends, are as follows:

Through the agency of vegetable hormones contained in the acorn kernels and activated by a solution of magnesium chloride, a profuse cryptogamic growth develops from the spores always present in the oak wood. This growth produces vitamin B complex and an enzyme complex rich in tannase, which dissociates the tannin in the wood. The growth itself is largely aminosuccinamide.

When this dissociation of the tannins is completed in the first batch described, the second batch of comminuted toasted wood is added. The spores of most of the fungi in this wood are destroyed in the toasting process. The enzyme tannase now again functions, and the tannins of the newly added wood are thus entirely dissociated. The Penicillia begin to develop from their spores, and the aminosuccinamide being a favorable media for their development, a prolific growth appears. The Penicillia, as previously stated, aid materially in developing both the bouquet and flavor of the liquor to be treated.

The cryptogamic growth, which is rich in aminosuccinamides, secretes an enzyme group rich in tannase. It functions as follows:

The tannase hydrolizes the tannins in the oak wood, thereby forming other acids which have a structure different than the tannins. These acids form their corresponding esters with the alcohols in the liquor or wine. The aminosuccinamides which, with the aid of the products of the growth of the Penicillia, dissolve in the wine or liquor and finally dissociate into succinic and succinamic acid and amino groups, at the same time causes oxidation. The succinic and succinamic acid, as well as the amino groups, form their corresponding esters.

Having thus described my invention, what I claim and desire to secure by Letters Patent is:

1. A method of treating wood to insure the prolific growth of fungi Penicillia, and to activate the wood so that it will produce in spirituous liquor in a relatively short time the same physical, chemical and biological phenomena as will occur over a period of years when spirituous liquor is treated with normal unactivated wood, comprising moistening tannin-containing wood with a growth-activating vegetable hormone, developing in said wood a prolific growth from cryptogamic spores, and processing the resulting batch until there is produced a fruit mustard-like odor indicative of the prolific development of fungi Penicillia.

2. A method of treating wood to insure the prolific growth of fungi Penicillia, and to activate the wood so that it will produce in spirituous liquor in a relatively short time the same physical, chemical and biological phenomena as will occur over a period of years when spirituous liquor is treated with normal unactivated wood, comprising moistening tannin-containing wood with a growth-activating vegetable hormone and developing in said wood a prolific growth from cryptogamic spores rich in aminosuccinamide which is a desirable medium for the growth of Penicillia fungi, mixing the so-processed wood with wood in which there has been destroyed a substantial portion of the fungi present other than the Penicillia, and germinating said mixture to produce a prolific development of the fungi Penicillia.

3. A method of treating wood to insure the prolific growth of fungi Penicillia, and to activate the wood so that it will produce in spirituous liquor in a relatively short time the same physical, chemical and biological phenomena as will occur over a period of years when spirituous liquor is treated with normal unactivated wood, comprising moistening a mixture of toasted and untoasted tannin-containing wood with spore-activating acorn kernels, and developing in said wood a prolific growth from cryptogamic spores rich in aminosuccinamide, which is a desirable medium for the growth of Penicillia, mixing the so-processed wood with wood in which there has been destroyed a substantial portion of the fungi present other than the Penicillia, and germinating said mixture to produce a prolific development of the fungi Penicillia.

4. A method of treating wood to insure the prolific growth of fungi Penicillia, and to activate the wood so that it will produce in spirituous liquor in a relatively short time the same physical, chemical and biological phenomena as will occur over a period of years when spirituous liquor is treated with normal unactivated wood, comprising moistening tannin-containing wood with a growth-activating vegetable hormone, germinating the resulting batch until a prolific growth of cryptogamic spores rich in aminosuccinimide is developed and the tannase produced during said germinating period has substantially dissociated the tannins present in the wood, the so-developed medium being favorable to the growth of Penicillia fungi, introducing into the resulting batch wood in which there has been destroyed a substantial portion of the fungi present other than the Penicillia, and germinating the resulting mass to produce a prolific development of fungi Penicillia.

5. The method of claim 4 in which the growth-activating vegetable hormone comprises acorn kernels.

6. A method of treating wood to insure the prolific growth of fungi Penicillia, and to activate the wood so that it will produce in spirituous liquor in a relatively short time the same physical, chemical and biological phenomena as will occur over a period of years when spirituous liquor is treated with normal unactivated wood, comprising moistening tannin-containing wood with a growth-activating vegetable hormone, germinating the resulting batch while the temperature of the batch is maintained at about 75° to 85° C. until a prolific growth from cryptogamic spores rich in aminosuccinimide is developed and the tannase produced during said germinating period has substantially dissociated the tannins present in the wood, the so-developed medium being favorable to the growth of Penicillia fungi, introducing into the resulting batch wood in which there has been destroyed a substantial portion of the fungi present other than the Penicillia, and germinating the resulting mass to produce a prolific development of fungi Penicillia.

7. A method of treating wood to insure the prolific growth of fungi Penicillia, and to activate the wood so that it will produce in spirituous liquor in a relatively short time the same physical, chemical and biological phenomena as will occur over a period of years when spirituous liquor is treated with normal unactivated wood, comprising moistening tannin-containing wood with a growth-activating, alcohol-preserved vegetable hormone and developing in said wood a prolific growth from cryptogamic spores rich in aminosuccinamide which is a desirable medium for the growth of Penicillia fungi, mixing the so-processed wood with wood in which there has been destroyed a substantial portion of the fungi present other than the Penicillia, and germinating said mixture to produce a prolific development of the fungi Penicillia.

8. The method of claim 4, wherein the growth-activating vegetable hormone has been alcohol-preserved.

9. The method of accelerating the aging of spirituous liquors comprising moistening tannin-containing wood with a growth-activating vegetable hormone and developing in said wood a prolific growth from cryptogamic spores rich in aminosuccinimide, which is a desirable medium for the growth of Penicillia fungi, mixing the so-processed wood with wood in which there has been destroyed a substantial portion of the fungi present other than the Penicillia, germinating said mixture to produce a prolific development of the fungi Penicillia, and introducing the so-activated wood into spirituous liquor, whereby the oxidation, aldehydation and esterification of certain of the liquor components is greatly accelerated.

10. The method of accelerating the aging of spirituous liquors comprising moistening tannin-containing wood with a growth-activating vegetable hormone, developing in said wood a prolific growth of cryptogamic spores, processing the resulting batch until there is produced a fruit mustard-like odor indicative of the prolific development of fungi Penicillia, and introducing the so-activated wood into spirituous liquor, whereby the oxidation, aldehydation and esterification of certain of the liquor components is greatly accelerated.

ERNST T. KREBS.